US009685790B2

(12) United States Patent
Wu et al.

(10) Patent No.: US 9,685,790 B2
(45) Date of Patent: Jun. 20, 2017

(54) MAXIMUM POWER POINT TRACKING FOR SOLAR PANELS

(71) Applicant: Virginia Tech Intellectual Properties, Inc., Blacksburg, VA (US)

(72) Inventors: Xinke Wu, Blacksburg, VA (US); Zijian Wang, Santa Clara, CA (US); Fred C. Lee, Blacksburg, VA (US); Feng Wang, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 513 days.

(21) Appl. No.: 14/065,986

(22) Filed: Oct. 29, 2013

(65) Prior Publication Data

US 2014/0306540 A1 Oct. 16, 2014

Related U.S. Application Data

(60) Provisional application No. 61/811,980, filed on Apr. 15, 2013.

(51) Int. Cl.
*H02J 3/38* (2006.01)

(52) U.S. Cl.
CPC ............... *H02J 3/385* (2013.01); *Y02E 10/58* (2013.01); *Y10T 307/685* (2015.04)

(58) Field of Classification Search
CPC combination set(s) only.
See application file for complete search history.

(56) References Cited

U.S. PATENT DOCUMENTS

| | | | | |
|---|---|---|---|---|
| 8,093,757 | B2 | 1/2012 | Wolfs | |
| 2010/0327659 | A1* | 12/2010 | Lisi | H01L 31/02021 307/82 |
| 2012/0205974 | A1* | 8/2012 | McCaslin | H02J 3/385 307/18 |
| 2014/0103892 | A1* | 4/2014 | McJimsey | H02J 3/385 323/271 |

* cited by examiner

*Primary Examiner* — Rexford Barnie
*Assistant Examiner* — Swarna N Chowdhuri
(74) *Attorney, Agent, or Firm* — Whitham, Curtis & Cook, P.C.

(57) ABSTRACT

Approximately one-half of the loss of delivered power from a solar panel having photovoltaic (PV) cells connected in series to form sub-panels due to shading is recovered at low hardware cost by connecting sub-panels in series and providing maximum power point tracking control in common for the series connected sub-panels such that the respective sub-panels produce equal voltages even in the presence of shading of a portion of one or more sub-panels. By doing so, the input voltage of respective power converters which control the voltage at which each sub-panel is operated can be placed close to the maximum power point of each sub-panel regardless of shading and maximum total power harvested even though the respective sub-panels are not operated at optimum voltages.

11 Claims, 6 Drawing Sheets

MAXIMUM POWER POINT TRACKING FOR SOLAR PANELS

CROSS-REFERENCE TO RELATED APPLICATIONS

This application claims benefit of priority of U.S. Provisional Application 61/811,980, filed Apr. 15, 2013, which is hereby incorporated by reference in its entirety.

FIELD OF THE INVENTION

The present invention generally relates to solar power collection panels and, more particularly, to maximizing harvested power from a solar power collection panel that is subject to partial shading.

BACKGROUND OF THE INVENTION

Increased difficulty and cost of obtaining and processing fossil fuels as well as concern over pollution caused by their use has increased interest in alternative sources of power, especially from so-called renewable resources such as hydroelectric power, wind-powered generators and solar power collection panels, generally referred to simply as solar panels. Of these possible power sources, solar panels involves the least expensive infrastructure and initial capital expense and are most easily scalable for use by private individuals and small communities. For example, while relatively large so-called solar farms may be installed to commercially produce relatively large amounts of power, many private residences have a roof portion that is properly oriented for solar power collection and of sufficient area to collect a significant fraction of the total power required for the residence. The cost of solar panels to cover such an area may be as small as several thousand dollars and such a cost can generally be recovered through reduction of commercially purchased power over a relatively small number of years.

However, such residential installations of solar panels are often subject to shading from surrounding trees, adjacent roof areas and other structures such as chimneys and the like. Since solar panels are generally comprised of a plurality of strings of series-connected photovoltaic (PV) cells, the shading of a very small number of individual PV cells can have a substantial effect on the total power that can be harvested from the panel. The voltage and current that are developed by a PV cell are a function of the light flux incident on the cell and the temperature of the cell. Therefore, when one or more PV cells in a series connected string are shaded or even a single PV cell partially shaded, both voltage and current of the entire string are reduced. Since available power is the product of the voltage and current produced, the reduction of power due to shading of even a single cell in a solar panel is significant.

In an effort to increase the amount of power that can be harvested, so-called maximum power point tracking (MPPT) control that involves use of a power converter to control the voltage input from the solar panel to the power converter. Since the load to which the power converter delivers power is effectively a power sink that consumes or stores all power delivered to it, the power converter can adjust the input voltage to itself from the PV cell or solar panel. At power levels below the maximum power available from a PV cell an increase in input voltage will cause an increase in current and power delivered. However, an increase in input voltage above the input voltage corresponding to maximum deliverable power can cause a reduction in current and power delivered. Therefore, MPPT control schemes cause a periodic perturbation in control of the input voltage to the power converter to determine if the input voltage is below or above that which will deliver maximum power and the power converter control can be adjusted such that the input voltage to the converter will seek, find and track the input voltage which will deliver maximum power.

MPPT control can be applied at the level of an individual PV cell or, with somewhat reduced accuracy and efficiency, to a string of an arbitrary number of series connected PV cells. However, accuracy and efficiency is diminished with increasing numbers of PV cells in a string and, in any case, the power that can be harvested from a string is limited by the reduction of voltage produced by any shaded or partially shaded PV cell in the string. On the other hand, dividing an MPPT controlled string into a plurality of shorter MPPT controlled strings multiplies the number of high accuracy voltage and current sensors and other high-speed circuits of substantial bulk and cost required to minimize effects of shading which may be slight.

SUMMARY OF THE INVENTION

It is therefore an object of the present invention to provide MPPT control to a plurality of strings of PV cells to provide harvesting near maximum power from a solar panel subject to shading.

In order to accomplish these and other objects of the invention, a first power converter having an input for connection to an output of a respective one of a plurality of strings of photovoltaic cells and an output connected in series with an output of a second power converter having an input connected to an output of another respective string of the plurality of photovoltaic cells, the series connected outputs of the first and second power converters being connected to a load, the first and second power converters include respective controllers is provided in combination with a maximum power point tracking controller that outputs a control signal to control the first power converter and the second power converter to output equal voltages.

In accordance with another aspect of the invention, a solar panel is provided comprising a plurality of strings of photovoltaic cells, a first power converter having an input connected to an output of a respective one of the plurality of strings of photovoltaic cells and an output connected in series with a second power converter having an input connected to an output of another respective string of the plurality of photovoltaic cells, the series connected outputs of the first and second power converters being connected to a load, the first and second power converters including respective controllers, and a maximum power point tracking controller that outputs a control signal to control the first power converter and the second power converter to output equal voltages.

In accordance with a further aspect of the invention, a method for harvesting power from a solar panel that is subject to being partially shaded comprising steps of electrically dividing the solar panel into a plurality of sub-panels, each sub-panel comprising a string of series-connected photovoltaic cells, controlling an output voltage of each sub-panel with a power converter of a plurality of power converters, connecting outputs of the plurality of power converters in series with each other and a load, controlling each of the plurality of power converters to output equal voltages in response to voltage and current provided to the load such that maximum total power is delivered from the plurality of power converters to the load.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
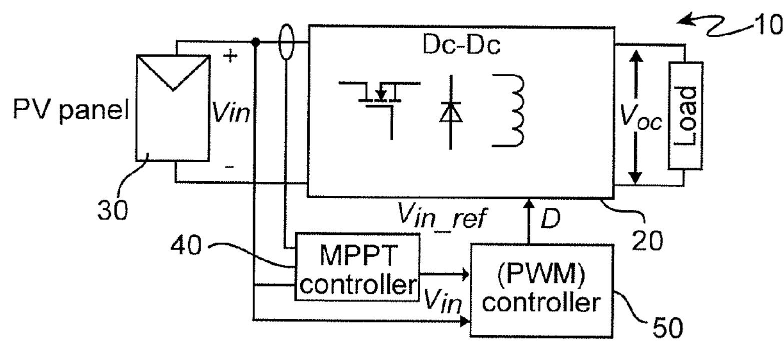
FIG. 1A is a schematic power interface converter of an exemplary pulse width modulation (PWM) type with MPPT control.
Figure 1B:
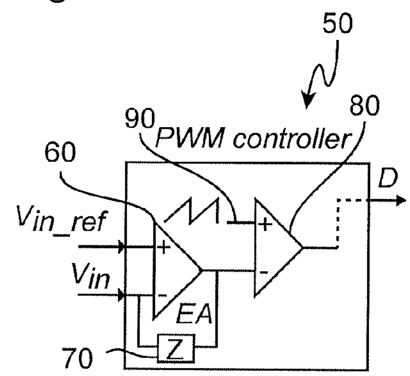
FIG. 1B is a simplified schematic diagram of the PWM controller of FIG. 1A.

Referring now to the drawings, and more particularly to FIGS. 1A and 1B, there is shown a high-level schematic diagram depicting and arrangement 10 for using of a power converter 20 of arbitrary topology for applying MPPT tracking control to a PV cell or an array 30 of PV cells of arbitrary extent. It should be understood that FIGS. 1A and 1B are arranged to facilitate an understanding of the invention and its underlying principles and, while the invention is not included in the depiction of FIGS. 1A and 1B, no portion of FIG. 1A or 1B is admitted to be prior art in regard to the present invention and, therefore, these Figures are labeled as "Related Art" in the drawings.

In the following discussion, use of a buck converter controlled by a pulse width modulation (PWM) controller for the buck converter will be described since the simplicity of both the buck converter and the PWM converter will facilitate a conveyance of an understanding of the invention sufficient to the practice thereof and, in fact, buck converters with PWM control are preferred for practice of the invention due to their simplicity and low cost. However, it should be understood that converters of other topologies are suitable for practice of the invention and any control technique or apparatus that is appropriate to control the power converter can be used, as indicated by the generalized depiction thereof in FIG. 1A.

As alluded to above, the maximum power that can be developed by a PV cell is a function of the operating conditions such as, principally, incident light flux and temperature of the PV cell. In particular, the voltage developed by a PV cell is a function of the incident light flux. Temperature and all other operating conditions that can affect maximum power produced by a PV cell are relatively unimportant or negligible in regard to compromise of developed electrical power due to shading or partial shading to which the present invention is directed. However, the optimum voltage at which a PV cell is operated when power is being drawn therefrom is also a function of the current being drawn and the actual power that can be harvested is thus a function of both the voltage produced and the current delivered while the voltage at which the PV cell is being operated may or may not correspond to the maximum power that can be harvested (e.g. delivered to a load and/or stored). Since the load is essentially a power sink, a power converter 20 can be operated to deliver any desired amount of power to the load at any required voltage and thus can also provide control of the input voltage, $V_{in}$, to itself which is also the output voltage at which a PV cell or cell string is operated.

Since PV cells exhibit an ohmic resistance when current is drawn, the voltage drop across a cell may thus be greater than, equal to or less than the voltage which a PV cell is able to produce at a given level of incident light flux.

The maximum power deliverable by a PV cell at a given level of incident light flux will coincide with the peak voltage at which the PV cell or string should be operated at a given level of incident light flux. Therefore, MPPT control can be performed by monitoring the output voltage and current with MPPT controller 40 and producing a corresponding reference voltage for the controller 50 of the power converter 20. A reference voltage also provided to the MPPT controller can be perturbed periodically to alter the voltage at which a PV cell or string of PV cells is operated to determine if delivered power is increased or decreased due to an increase or decrease in the reference voltage. A corresponding adjustment of the reference voltage can then be made if an increase in output voltage of the PV cell causes an increase in current and delivered power or vice-versa.

Such perturbations can be performed at an arbitrarily high frequency to be effectively continuous and achieve a rapid convergence at the maximum power point. However, once that maximum power point is found, perturbations should only be as frequent as is necessary to track changes in maximum power due to changes in illumination (or other, less significant conditions such as temperature) since, if the cell or string is being operated at the maximum power point, each perturbation will cause at least a short duration divergence from the maximum power point even though the divergence can be made as small as the resolution of a current sensor will allow. Thus, the MPPT controller can seek the maximum power point of the PV cell. If both increase and decrease of the output voltage of the PV cell cause a decrease in delivered power, the PV cell is being operated at its maximum power point for a given illumination flux and the maximum power point can be tracked. It should be noted that Vo of the PV cell is identified as $V_{in}$ of the converter; which voltage is supplied to both the MPPT controller 40 and the (e.g. PWM) controller 50 of the power converter 20 as illustrated in FIG. 1B.

Although FIG. 1B is simplified for purposes of facilitating conveyance of an understanding of MPPT control strategy, the basic constitution and operation of the power controller can be visualized as two cascaded comparators 60, 80. The first comparator or error amplifier 60 receives inputs of both $V_{in}$ from the PV cell 30 and $V_{in\_ref}$ from MPPT controller 40 responsive to both $V_{in}$ and the sensed current being drawn from the PV cell. Feedback of the output of comparator 60 determines the transfer function or gain of the comparator 60 in accordance with impedance Z in the feedback path 70. The output of comparator 60 is supplied as an input to comparator 80 which also receives an input 90 from a ramp or triangular waveform generator. Comparator 80 thus generates an output D that has a duty cycle corresponding to the magnitude of the input from comparator 60 since the magnitude of $V_{in\_ref}$ will modulate the width of pulses produced by comparator 80.

Figure 2:
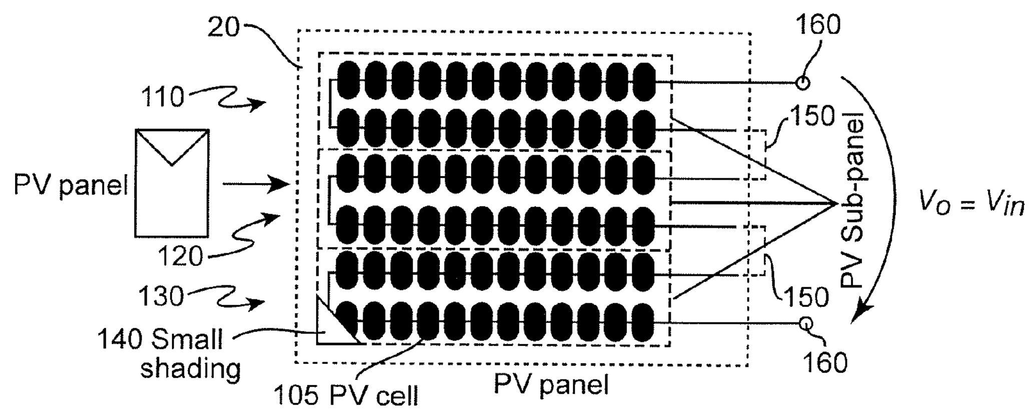
FIG. 2 is a simplified diagram of the internal construction and connection of PV cells in a known, commercially available solar panel.

Referring now to FIG. 2, the construction of a commercially available solar panel 20 will now be discussed. Generally, a commercially available solar panel is comprised of a rectangular array of individual PV cells 105. Groups of PV cells are generally connected in series connected strings 110, 120, 130 to essentially form sub-panels and terminal connections of the strings brought out of the array or panel to allow some flexibility in obtaining different voltages from the solar panel or providing electrically separated or isolated power sources. The number of such serially connected strings of PV cells or sub-panels in commercially available solar panels is generally three. In most applications of solar panels, however, the strings of series connected PV cells are connected in series to form a single string as indicated by dashed lines 150 and only one pair of terminals 160 brought out for the entire solar panel.

As alluded to above, in small solar panel installations such as may be applied or retrofit to a residence, business establishment or other habitable structure, the solar panel may be subject to minor shading as illustrated at 140 (representing only partial shading of a single PV cell). In such installations, the solar panel is generally fixed in location and orientation and, if properly designed, shading can be limited to occurring at particular times of day in particular seasons and the extent of shading may be limited to a very few PV cells or even a fraction of the area of a single PV cell. Nevertheless, any degree of shading can significantly affect the amount of power that can be harvested from all of the cells that are in the series connection including the shaded PV cell(s) as graphically depicted in FIG. 3.

Figure 3:
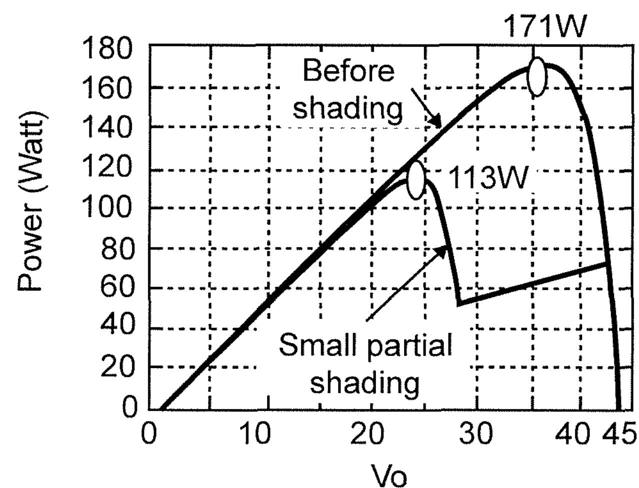
FIG. 3 is a graphical comparison of the power available from a PV cell string as a function of available output voltage with or without shading or partial shading of one or more PV cells in the string.
Figure 4:
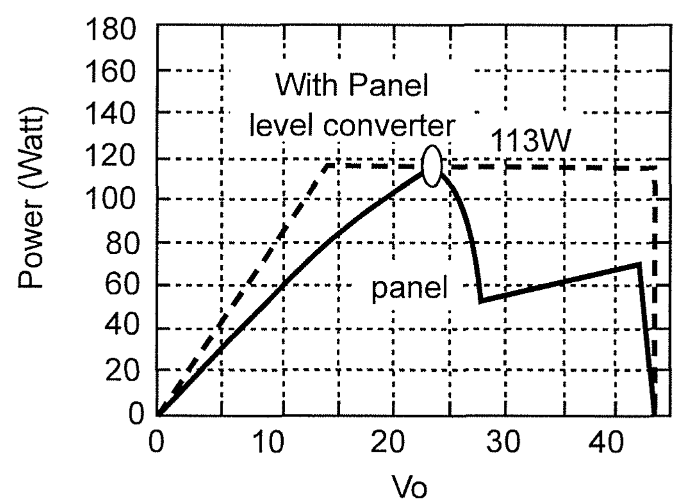
FIG. 4 is a similar graph showing the limitation of power as a function of output voltage of a PV cell string subject to the shading.

FIG. 3 is a graphic comparison of the power that can be harvested from a series connected string of PV cells (e.g. string 130) as a function of the output voltage, Vo, at which the string is operated. As alluded to above, a fully illuminated cell at a given level of light flux will produce a voltage and, if current is drawn from the PV cell, power will increase almost linearly with the voltage at which the PV cell is operated until the current drawn through the ohmic resistance of the PV cell or string causes a somewhat broad but, nevertheless, well-defined peak. At higher operating voltages, power drops precipitously as current is limited by the voltage drop across the ohmic resistance of the PV cell approaching the voltage the PV cell can develop at the given level of incident light flux. Reduction of the level of illumination of the PV cell such as would be caused by partial shading causes the peak power to be greatly reduced and shifted to a lower operating voltage. However, it should be noted that the power does not fall to near-zero for a string of PV cells but reaches a minimum. At increased operating voltages, a small amount of the power reduction due to shading can be compensated by other PV cells in the string. However, the peak power that can be harvested from the string is limited by the shaded PV cell(s) in the string, even if a power converter is used to control extraction of power and control the operating voltage of the entire string or panel (e.g. with or without MPPT control of the converter) as shown in FIG. 4. It should be noted that, in this type of circumstance, the maximum power operating point of the shaded cell(s) will differ substantially from the maximum power operating point for fully illuminated cells; resulting in maximum power of the string or panel (e.g. if connected as a single string) that can be obtained over a wide range of converter output voltages but which are not optimum for either shaded or fully illuminated cells. The maximum converter power output cannot exceed the power at the optimum operating point of the shaded PV cell(s) even though the converter can deliver that maximum amount of power over a wide range of voltages while, with MPPT, controlling its own input voltage to coincide with the maximum power point of the PV cell or string.

It follows, conversely, from this observation that more power can be harvested from an array of PV cells by eliminating connection in strings or reducing the length of strings, providing MPPT control to the individual or smaller numbers of PV cells and connecting the outputs of the converters in series so that all PV cells can be operated at or closer to the optimum voltage for the illumination incident thereon. Such a solution is known and described in, for example, U.S. Pat. No. 8,093,757 to Wolfs, which is fully incorporated by reference.

Wolfs discloses a power harvesting system for a solar powered vehicle in which it is assumed that individual PV cells will be mounted on curved surfaces and thus the light incident on respective PV cells will be highly variable due to changes in the angle of incident light, possible shading and irregular temperature distribution and cooling effects on different portions of the vehicle and that such conditions are subject to rapid change. Accordingly, it is proposed by Wolfs to apply MPPT control to each individual PV cell or solar generator including nine or fewer PV cells on the vehicle so that maximum power can be harvested regardless of the orientation or temperature of the vehicle or parts thereof; in effect, assuming that the maximum power point of each individual PV cell on the vehicle can potentially be different from that of every other PV cell on the vehicle.

The economy achieved by the arrangement disclosed by Wolfs (at the cost of greatly multiplying the number of MPPT controllers required or utilized) is that if the DC-to-DC converter outputs are connected in series, a single inductor can be used for the entire array of PV cells rather than providing an inductor in each DC-to-DC converter for individual PV cells or short strings which would be prohibitive in regard to cost, size and weight for an application to a vehicle. Even the elimination of a large number of inductors is only feasible in view of the need to harvest maximum power from the relatively small proportion of PV cells that will be properly illuminated at any given time when placed on the surface of an operating vehicle. The use of converters of simple topology and small number of components and MPPT controllers of very small size and weight are also necessarily required for such an application to be practical.

These concerns are not as great for applying MPPT to solar panels where a plurality of PV cells are connected in series in respective strings, as alluded to above, but efficiency is lost when shading occurs because the MPPT point of the string will not match the MPPT point of individual PV cells in the string or sub-panel. This effect is severe for commercial solar panels that have limited numbers of strings per panel and especially severe where the strings are connected in series and a single converter is used at the panel level to control Vo. Moreover, since the maximum power point of strings of PV cells may differ, the maximum power point of a panel comprising a plurality of series-connected strings may remain substantially constant over a range of operating voltages. Therefore, MPPT control can be no more than marginally effective and may result in some system instability since there is no well-defined maximum in the power versus operating voltage characteristic of the entire panel on which an MPPT controller can converge.

Figure 5:
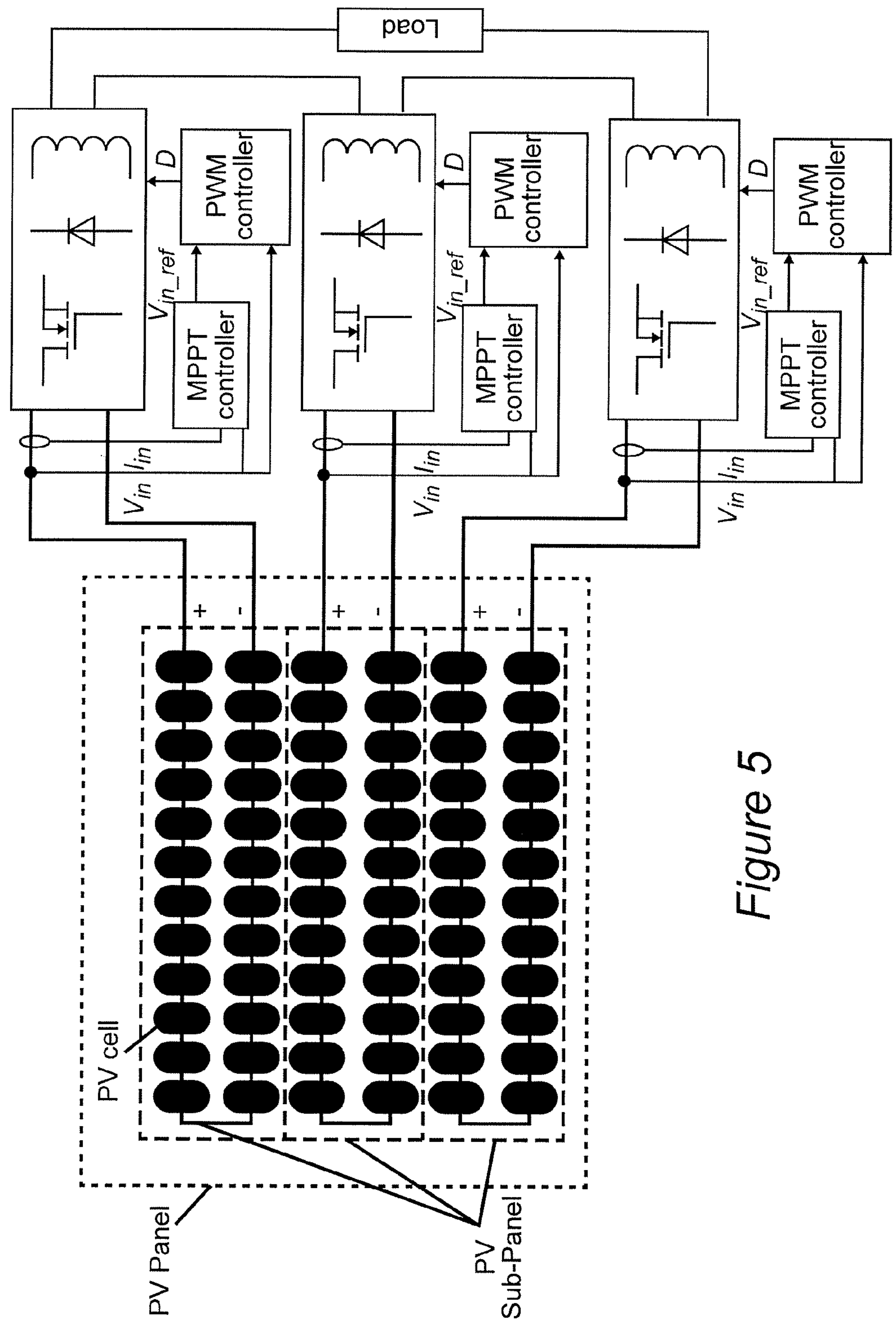
FIG. 5 is a schematic diagram of a technique of subdividing a solar panel into a plurality of PV cell strings or sub-panels and application of MPPT control to each sub-panel.

Referring now to FIG. 5, an arrangement for increasing the amount of power that can be harvested from a partially shaded solar panel will now be discussed. As alluded to above, commercially available solar panels generally have three strings of series connected PV cells that may be considered as sub-panels if the strings are not connected in series into a single, longer string of PV cells. Since partial shading of a solar panel is likely to be localized in only a relatively small portion of the solar panel, it is relatively likely that any shading that occurs will affect only one string or less than all strings of PV cells. Therefore, since the variation between PV cells is likely to be small in the absence of shading, the MPPT control of an entire string will converge on an operating point that is very nearly optimal for all PV cells in a string of PV cells that are unaffected by shading.

Thus, MPPT control will provide optimal power harvesting from all strings that are unaffected by shading and harvested power will be reduced in only the string or strings where shading occurs. Therefore, unaffected strings can be operated at an increased Vo and maximum power will be delivered while a reduced Vo producing lower power will be limited to the string(s) affected by shading. If the outputs of the converters are connected in series, the converter outputs will carry the same current and the total reduction in voltage applied to the load will be proportionally smaller since the unshaded strings are unaffected by the shading of any other string. The duty cycle of the converter in each string will be optimal for the corresponding string and close to optimum for each PV call in each unaffected string even though the converter corresponding to a shaded or partially shaded string will be controlled at a different duty cycle which is unlikely to be optimum for any unshaded PV cell in that string.

Therefore, substantially greater power can be harvested from the arrangement of FIG. 5 than the amount of power to which the solar collector would be limited by even slight and partial shading of even a single PV cell in a string. However, the arrangement of FIG. 5 requires high accuracy voltage and current sensors and separate MPPT for each string/sub-panel into which a solar panel may be electrically divided. Therefore, the arrangement of FIG. 5, while effective to increase harvested power under conditions of partial solar panel shading, can only do so at a substantially increased cost compared to use of a single converter (with or without MPPT control) at a panel level, as alluded to above.

Figure 6:
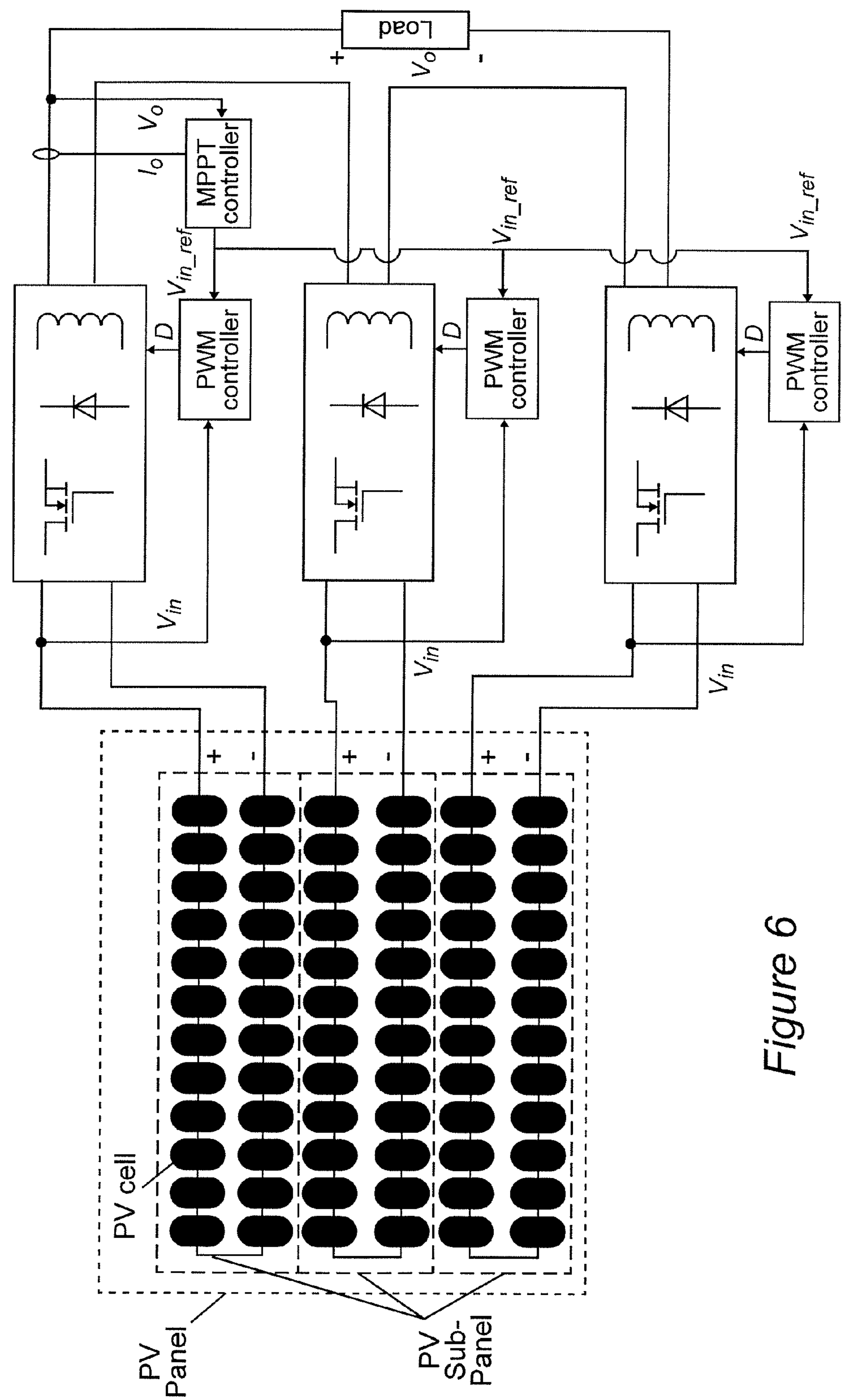
FIG. 6 is a schematic diagram of an MPPT control arrangement in accordance with the invention.
Figure 7:
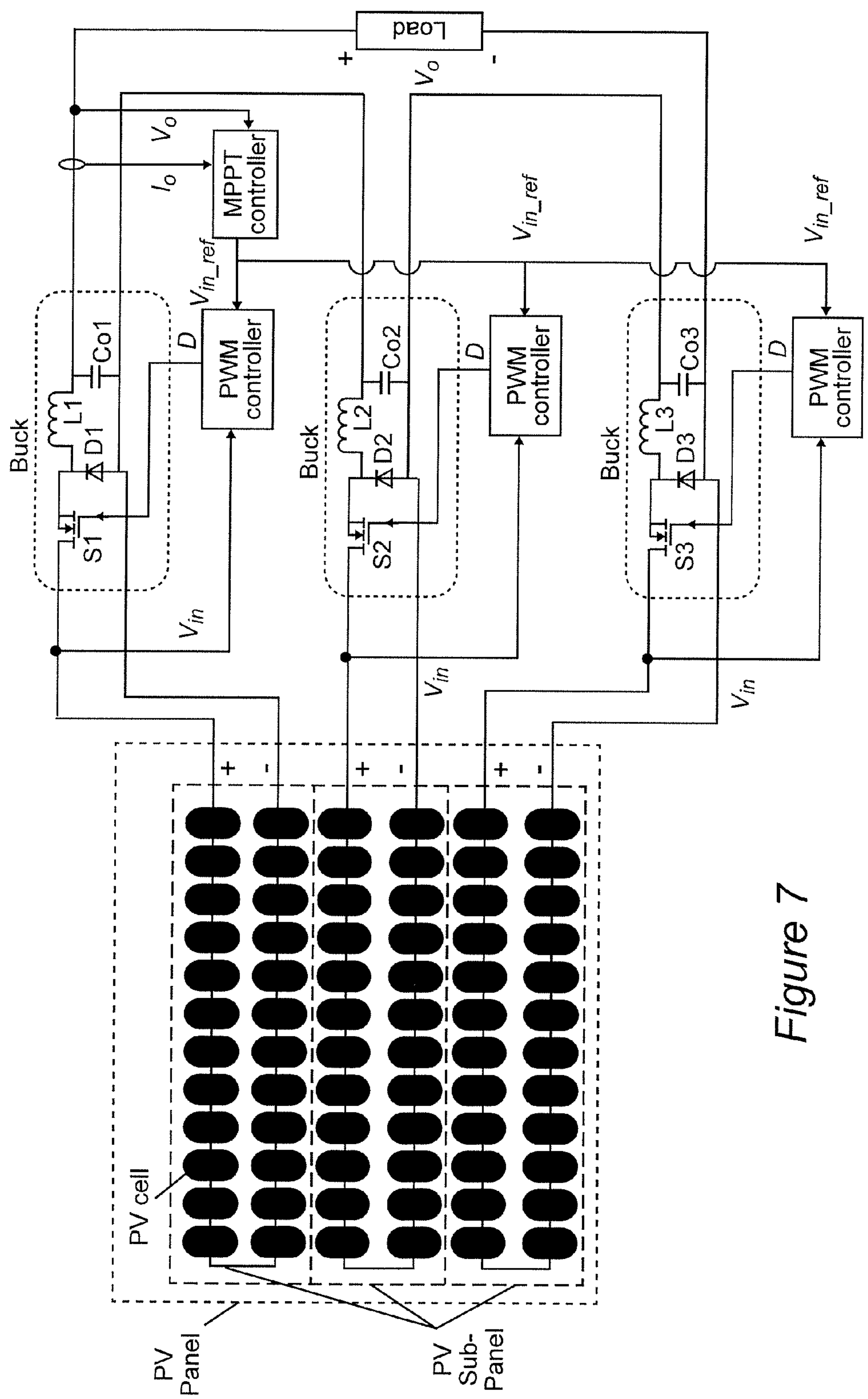
FIG. 7 is a more detailed implementation of the MPPT control arrangement of FIG. 6 using buck sub-panel controllers, and FIG. 8 in a graphical comparison illustrating the gain in harvested power by the invention with the limited power available illustrate in FIG. 4 and the increased harvested power available from the arrangement of FIG. 5.

Referring now to FIGS. 6 and 7, an arrangement in accordance with the invention in which most of the increased costs of harvesting additional power beyond limits imposed by shading are avoided while harvesting an amount of power which is only slightly diminished from the arrangement of FIG. 5 is schematically illustrated. FIGS. 6 and 7 are identical in organization but FIG. 7 provides detailed illustration of use of a preferred (for simplicity and low cost) buck converter with PWM control responsive to MPPT in common for the sub-panels. In this arrangement, the solar panel remains divided into sub-panels (e.g. in accordance with the PV cell strings into which commercially available solar panels are divided) with a converter and PWM controller for each sub-panel. The outputs of the respective sub-panels are connected in series as in FIG. 5. However, in this arrangement, a single MPPT controller is provided to provide control of all of the PWM converters. This arrangement can be sufficiently compact and inexpensive to include or retrofit into solar collectors that are commercially available.

It will be noted that the arrangement of FIGS. 6 and 7 differs from that of FIG. 1 or 5 in the connection of voltage and current sensors to the MPPT controller. In FIGS. 1 and 5, the PV cell string output voltage and current is directly monitored and used for MPPT control. In FIGS. 6 and 7 the combined output of the series connected converters is monitored for MPPT control. Since the converter outputs corresponding to electrically divided sub-panels or PV cell strings are connected in series, the output voltage is the sum of the output voltages of the respective power converters. Also, since the converter outputs are connected in series, the converter output currents are constrained to be identical. Therefore, the combined output power of the respective converters can be used for MPPT control.

The input voltage $V_{in\_ref}$ is provided in common to all of the PWM controllers as described above in regard to FIG. 1B such that $V_{in\_ref}$ is compared with $V_{in}$ (=Vo as referenced to the PV string output). Thus the perturbations of $V_{in\_ref}$ provided by the MPPT controller and the input voltage $V_{in}$ is regulated accordingly by the PWM control loop. Therefore, perturbation of $V_{in}$ can be achieved even though the MPPT controller is referenced to the combined power converter outputs. The input voltages of the converters will thus be identical even though the converters are driven with signals of different duty cycles produced by the respective PWM controllers. The operating point tracked by the MPPT controller will, however, remain close to but not precisely at the optimum voltage to extract near-maximum power from each converter. The somewhat broad peaks of the deliverable power characteristic of FIGS. 3 and 4 holds reduction in delivered power to a minimum even though the operating point tracked by the MPPT control is not precisely optimum for any of the converters or sub-panels.

Figure 8:
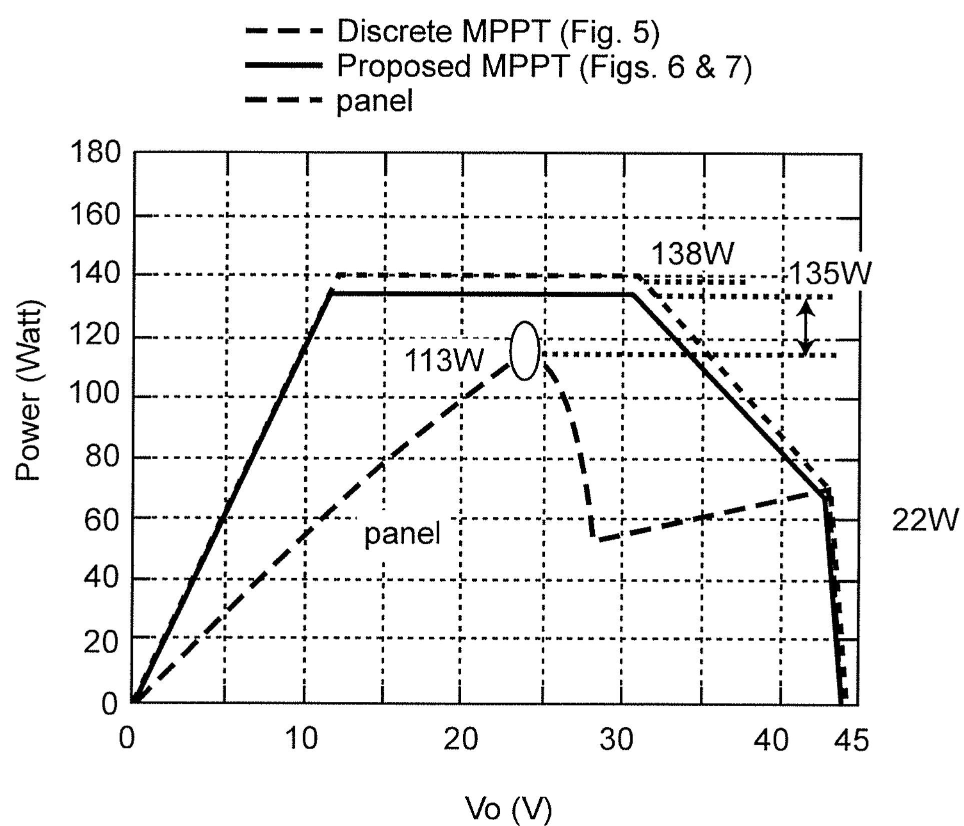

FIG. 8 provides a graphical comparison of the increased power that can be harvested by the invention in the presence of the same degree of partial shading of a PV cell string in a solar panel and the power that can be harvested using only a single MPPT control for the solar panel and the power that can be harvested when separate MPPT controls is provided for each converter. The invention provides slightly less than a 22% increase in harvested power over a single converter arrangement but only about a 2% reduction from an arrangement requiring separate MPPT control for a converter for each sub-panel. From a comparison of FIG. 8 with FIG. 3 it is seen that approximately one-half of the reduction of harvested power due to shading can be recovered without undue cost, size, weight or complexity through use of the invention.

In view of the foregoing, it is readily seen that substantial reduction in effects of shading of solar panels and, especially, commercially available solar panels can be achieved at low cost by dividing the solar panel into sub-panels, each having a simple power converter and including or retrofitting MPPT control which is common to all respective sub-panels and controlled in accordance with a combined output of the converters. The common MPPT control and additional power converters and PWM controllers can be easily and inexpensively retrofitted to existing commercially available panels (e.g. as an upgrade for existing commercially available solar panels or existing solar panel installations or optionally included in solar panels as manufactured and commercially marketed. It should also be appreciated that the invention can be applied to solar panels having any number of sub-panels and to less than all of the sub-panels of a solar panel.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In combination:

a first power converter having an input for connection to an output of a respective one of a plurality of strings of photovoltaic cells and an output connected in series with an output of a second power converter having an input connected to an output of another respective string of said plurality of photovoltaic cells, said series connected outputs of said first and second power converters being connected to a load, wherein said first and second power converters include respective controllers, and a maximum power point tracking controller that outputs a control signal to control said respective controllers of said first power converter and said second power converter such that each of said plurality of strings of photovoltaic cells output equal voltages to said first and second power converters.

2. The combination as recited in claim 1, further including voltage and current sensors having inputs coupled to said series connection of said outputs of said power converters, wherein said voltage and current sensors provide inputs to said maximum power point tracking controller.

3. The combination as recited in claim 1, wherein said power converters are buck converters.

4. The combination as recited in claim 1 wherein controllers for said power converters are pulse width modulation controllers.

5. A solar panel comprising:

a plurality of strings of photovoltaic cells, a first power converter having an input connected to an output of a first one of said plurality of strings of photovoltaic cells and an output connected in series with a second power converter having an input connected to an output of a second string of said plurality of strings of photovoltaic cells, said series connected outputs of said first and second power converters being connected to a load, said first and second power converters including first and second controllers, respectively, and a maximum power point tracking controller that outputs a control signal to control said first and second controllers of said first power converter and said second power converter such that said first and second strings of photovoltaic cells output equal voltages to said first and second power converters.

6. The solar panel as recited in claim 5, further including voltage and current sensors having inputs coupled to said series connection of said outputs of said power converters, said voltage and current sensors provide outputs to said maximum power point tracking controller.

7. The solar panel as recited in claim 5, wherein said power converters are buck converters.

8. The solar panel as recited in claim 5, wherein controllers for said power converters are pulse width modulation controllers.

9. The solar panel as recited in claim 5, wherein a number of said strings of photovoltaic cells is three.

10. The solar panel as recited in claim 9, further including a third power converter connected in series with said First and second power converters and said load, said third power converter including a controller and wherein said controller of said third power converter is controlled by said maximum power point tracking controller to produce an output voltage equal to said output voltage of said first and second power converters.

11. A method for harvesting power from a solar panel that is subject to being partially shaded, said method comprising steps of electrically dividing said solar panel into a plurality of sub-panels, each sub-panel comprising a string of series-connected photovoltaic cells, controlling an output voltage of each sub-panel with a power converter of a plurality of power converters, connecting outputs of said plurality of power converters in series with each other and a load, controlling each of said plurality of power converters in common such that each of said plurality of sub-panels output equal voltages in response to voltage and current provided to said load such that substantially maximum total power is delivered from said plurality of sub-panels to said load without maximizing power from each sub-panel individually.

* * * * *